(12) United States Patent
Haney

(10) Patent No.: US 11,613,384 B2
(45) Date of Patent: Mar. 28, 2023

(54) PRECISION LANDING FOR ROCKETS USING DEEP REINFORCEMENT LEARNING

(71) Applicant: Brian Haney, Pittsburgh, PA (US)

(72) Inventor: Brian Haney, Pittsburgh, PA (US)

(*) Notice: Subject to any disclaimer, the term of this patent is extended or adjusted under 35 U.S.C. 154(b) by 279 days.

(21) Appl. No.: 17/156,943

(22) Filed: Jan. 25, 2021

(65) Prior Publication Data
US 2022/0234765 A1 Jul. 28, 2022

(51) Int. Cl.
| | | |
|---|---|---|
| B64G 1/36 | (2006.01) | |
| B64G 1/62 | (2006.01) | |
| G06N 5/04 | (2023.01) | |
| G06N 3/04 | (2023.01) | |
| B64G 1/40 | (2006.01) | |
| B64G 1/24 | (2006.01) | |

(52) U.S. Cl.
CPC ............ B64G 1/36 (2013.01); B64G 1/401 (2013.01); B64G 1/62 (2013.01); G06N 3/04 (2013.01); G06N 5/04 (2013.01); B64G 2001/247 (2013.01)

(58) Field of Classification Search
CPC ...... B64G 1/36; B64G 1/62; B64G 2001/247; B64G 1/646; B64G 1/244; B64G 1/002; B64G 1/401; B64G 1/402; G06N 3/04; G06N 5/04; G06N 7/005; G06N 3/006; G06N 3/08; G06N 3/0454
See application file for complete search history.

(56) References Cited

U.S. PATENT DOCUMENTS

| | | | | |
|---|---|---|---|---|
| 2008/0023587 A1* | 1/2008 | Head | ................... | G01C 21/24 244/171.1 |
| 2018/0127114 A1* | 5/2018 | Salkeld | ................ | B64G 1/646 |
| 2019/0291864 A1* | 9/2019 | Liu | ...................... | H04N 7/185 |
| 2020/0365512 A1* | 11/2020 | Rothschild | ............... | B64G 1/10 |

OTHER PUBLICATIONS

Brian Gaudets. Roberto Furfaro; Adaptive Pinpoint and Fuel Efficient Mars Landing Using Reinforcement Learning; Oct. 2014; IEEE/CAA Journal of Automatica Sinica; vol. 1 No. 4; pp. 397-411 (Year: 2014).*

* cited by examiner

*Primary Examiner* — Michael C Zarroli

(57) ABSTRACT

The invention is methods for landing rockets with precision using deep reinforcement learning for control. Embodiments of the invention are comprised of three steps. First, sensors collect data about the rocket's physical landing environment, passing information to rocket's database and processors. Second, the processors manipulate the information with a deep reinforcement learning program to produce instructions. Third, the instructions command the rocket's control system for optimal performance during landing.

17 Claims, 2 Drawing Sheets

PRECISION LANDING FOR ROCKETS USING DEEP REINFORCEMENT LEARNING

SUMMARY OF THE INVENTION

Successfully landing a rocket is a difficult task, especially in environments with inclement weather or uncertain surface conditions. As a result, missions utilizing reusable rockets are often strictly limited to specified time windows based on weather forecasts. The present invention provides methods for controlling a rocket booster during landing with deep reinforcement learning, optimizing landing success in dynamic and uncertain environments. First, sensors collect data about the rocket's landing zone, passing the information to a database onboard the rocket. The sensor types may include GPS, radar, LiDAR, or inertial navigation systems, which collect and transmit the data to an onboard processor. Next, the rocket's processor manipulates the data with a deep reinforcement learning algorithm producing instructions. The deep reinforcement learning algorithm includes an agent which has been trained in a simulation environment. The agent interacts with the rocket's data collected by sensors, which are projected to represent the rocket's physical environment. Then, the instructions command the rocket booster's control system for optimal performance. Further, the instructions evolve according feedback from the rocket's landing environment, accounting for dynamic uncertainty.

BACKGROUND TO THE INVENTION

Field of the Invention

The field of the invention relates to systems and methods for rocket control during landing using machine learning computer programs. New technologies often represent a convergence of many different streams of techniques, devices, and machines, each coming from its own separate historical avenue of development. As such, the field of this invention lies at the intersection of three broader fields: rocketry, artificial intelligence, and machine learning. Rocketry involves the study, engineering, and construction of space vehicles launching to Earth orbit. Artificial Intelligence (AI) is a sub-field of computer science focusing on machines making decisions that mirror and replicate the human mind's thoughtful processes. Machine learning is a process for programming software that learns from data and acts, iteratively improving over time.

Background Art

The Cold War sparked a wave of development in rocket technology, which rapidly evolved during the 1950s and 1960s. In 1957, the Soviet Union launched Sputnik, marking the first time in human history mankind had put an object into orbit. In 1961, the Vostok 1 carried Russian Cosmonaut Yuri Gagarin once around the Earth, making him the first human in space. In the west, the Apollo Program gave birth to one of the greatest achievements in human history. In 1969, Neil Armstrong and Buzz Aldrin became the first people in human history to step foot on the moon as part of the Apollo 11 mission.

The decades after the Apollo program were dedicated to the development of satellite and orbital infrastructure. As a result, today's existing Earth-orbiting infrastructure of satellites is undoubtably one of humanity's most profound technological accomplishments. In fact, the existing structure of more than 5,500 satellites has led to the rapid globalization of the world. Moreover, the modern satellite infrastructure is now an indispensable feature of modern humanity. Consider satellites power telecommunications networks, global positioning systems, and climate monitors. For a long time, launching satellites to orbit could cost more than $1 billion per launch.

Until the early part of the twenty-first century, rockets were fully expendable, meaning they could only be used once. The major innovation of modern rocket technology is the reusable rocket. The innovation is well displayed in launch price-performance. From a financial perspective rockets are much like jets because the fuel of a trip is only a small fraction of the cost. So, the major cost of launching a payload into orbit is the rocket itself. By making rocket boosters reusable, like jets, the cost-efficiency of spaceflight is experiencing order of magnitude improvements. The essential element for reusable rocket technology is the ability to land. However, current methods for landing rockets utilize optimization techniques based on deterministic environments but are unable to generalize about changes in dynamic or uncertain environments.

The state of the art in rocket control hardware is field programmable gate arrays (FPGAs), an integrated circuit designed to be configured by a designer after manufacturing. For rockets, the FPGA must be radiation hardened to combat radiation effects in space. The FPGA configuration usually runs on a hardware description language, similar to languages used in integrated circuits. From an architectural perspective, FPGAs contain an array of programmable logic blocks and reconfigurable interconnects, allowing logic blocks to be wired together. Logic blocks can be configured to perform complex convolutional functions. FGPAs typically have both memory and processing capabilities, supporting dynamic programming techniques. For example, the FGPA may be embedded with an artificial intelligence computer program.

Developing as a new stream of research with applications for autonomous control, AI refers to computer systems replicating human thoughtful processes and directed behavior. AI is a field uniquely positioned at the intersection of several scientific disciplines including computer science, applied mathematics, and neuroscience. The AI design process is meticulous, deliberate, and time-consuming—involving intensive mathematical theory, data processing, and computer programming. A specific field within AI, machine learning technologies drive the bleeding edge in innovation.

Deep learning is a type of machine learning concerned with the acquisition of knowledge from large amounts of data. Deep learning involves modeling the human brain with machines to process information. Both artificial and biological neurons receive input from various sources, mapping information to a single output value. Every neuron in the brain is connected to other neurons through architectures called synapses and dendrites-which receive electrical impulses from other neurons. Once the neuron collects enough electrical energy to exceed a certain amount, the neuron transmits an electrical charge to other neurons in the brain. This transfer of information in the biological brain provides the basic framework for the way in which neural networks work.

Consider, deep learning is a process by which neural networks learn from large amounts of data. The internet is the driving force behind most modern deep learning strategies because the internet has enabled humanity to organize and aggregate massive amounts of data. Indeed, the explosion in data collection since the inception of the internet continues to result in increasingly available data, as well as improved deep learning applications and models. This is particularly important because the data—not human programmers—drive progress in deep learning applications. Generally, deep learning systems are developed in three parts: data pre-processing, model design, and learning. A specific type of deep learning program used for robotics control is convolutional neural processing.

Convolutional Neural Networks (CNNs) are a deep learning mechanism for computer vision. The human visual system is the inspiration for the CNNs architectural design. In human vision light enters the eye through the cornea, passing to the lens. As light passes through the lens, the light is convoluted and transferred to the retina. As a mathematical operation, convolution uses two matrices: an input matrix and a kernel. This convolutional operation inspires the architecture for computer vision systems.

Additionally, CNNs contain convolutional layers with learnable parameters. Each kernel is convolved across an input matrix and the resulting output is called a feature map. The full output of the layers is obtained by stacking all of the feature maps to create dimensionality. Classification and state space assignment are common CNN functions. For example, a CNN may classify objects or areas based upon their similarity. In fact, CNNs are specifically used in computer vision because of their ability to map the locality of data. For example, a common computer vision data type is data from a Light Detection and Ranging Device ("LIDAR"). In short, LIDAR is a type of optical radar sensor with a transmitter and a receiver, calculating distances and generating environmental data using a laser and the constancy of light speed. CNNs are the cutting edge in computer vision, but reinforcement learning is state of the art in machine decision making.

Reinforcement learning programs contain three elements: [(1)] model: the description of the agent-environment relationship; [(2)] reward: the agent's goal; and a [(3)] policy: the way in which the agent makes decisions. In reinforcement learning, the environment represents the problem. An agent is an algorithm solving the environment or problem. The reward acts as a feedback mechanism, allowing the agent to learn independent of human training. Generally, an optimal policy is developed to maximize value. The optimal policy is developed using a statistical system for machine learning called training, where the software program iterates toward better performance. Performance is defined according to optimal metrics similar to getting a high score in a computer game, using a value function.

A value function may be used to compute the value of a given state and action according to a defined policy. In other words, the value function computes the best decision according to a policy. For example, the value function is equal to the expected sum of the discounted rewards for executing policy over the entire environment, called the episode. The expected future rewards are discounted with a discount factor. The discount factor is typically defined between zero and one. If the discount factor is low, the agent considers present rewards to be worth more and if the discount factor is high, future rewards are worth more—relatively speaking.

The goal for reinforcement learning programming is to identify and select the policy which maximizes expected reward for an agent acting in an environment. In the robotics context, this policy may be captured in a computer program and embedded to hardware for processing and control. Policy evaluation is the process of computing the expected reward from executing a policy in a given environment, which can be used in a general process called policy iteration for computing an optimal policy. In doing so, the agent may take actions in real-time according to a defined policy optimizing control metrics.

Convergent systems are machines capable of sensing their environment and achieving goals, representing the integration of machine decision and perception technologies. Deep reinforcement learning technologies, a specific type of convergent system, are machine learning techniques resulting from a technical convergence in reinforcement and deep learning technologies. Deep reinforcement learning systems have three capabilities that set them apart from all previous AI systems: [(1)] generalization; [(2)] learning; and [(3)] intelligence.

Deep reinforcement learning is a new type of machine learning resulting from the technical convergence of two more mature machine learning methods, deep learning and reinforcement learning. Generally, there are three different frameworks for deep reinforcement learning: q-networks, policy optimizers, and actor-critic. Q-networks are neural networks embedded in the reinforcement learning architecture using q-learning for predicting rewards, a reinforcement learning technique for training agents. Another example, policy optimizers, iterate toward an optimal policy using a neural network to predict policy performance progress. A third deep reinforcement learning variant is the actor-critic framework which uses an actor neural network and critic neural network to optimize an agent's action selection.

As rocket technology evolves to support point-to-point, orbital, and extraterrestrial missions, safety in landing rockets is absolutely critical. Moreover, rocket landing is a difficult, stochastic, and unpredictable task, especially in environments with inclement weather. Therefore, launch missions are often strictly limited based on weather. Limiting launch based on time windows is expensive, causing delays for contractors and Government agencies. As such, technology enabling launch without weather related restrictions advances both science and the technical art. Thus, there is a need for an intelligent control system, accounting for environmental uncertainties and action oriented dynamic processing. As such, the present invention is methods for rocket control during landing using deep reinforcement learning to optimize safety and landing performance.

DETAILED DESCRIPTION OF THE INVENTION

Figure 1:
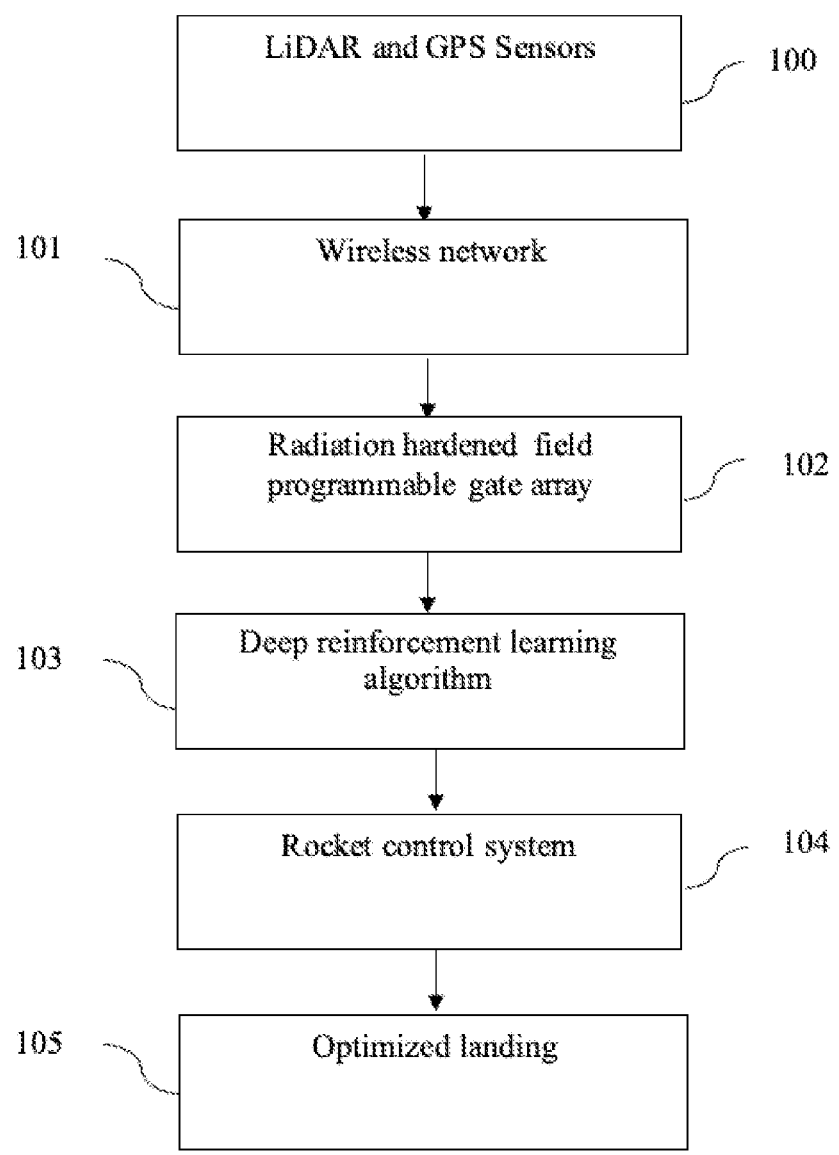
FIG. 1 describes embodiments of the present invention as an information flow model.

FIG. 1 describes embodiments of the present invention as an information flow model including LiDAR and GPS Sensors which collect information about the landing zone (100); a wireless network which communicates information across the rocket's hardware (101); which is a radiation hardened field programmable gate array (102); with an embedded deep reinforcement learning algorithm (103); which produces instructions that command the rocket's control system (104); to result in an optimized, safe, and efficient landing (105).

Figure 2:
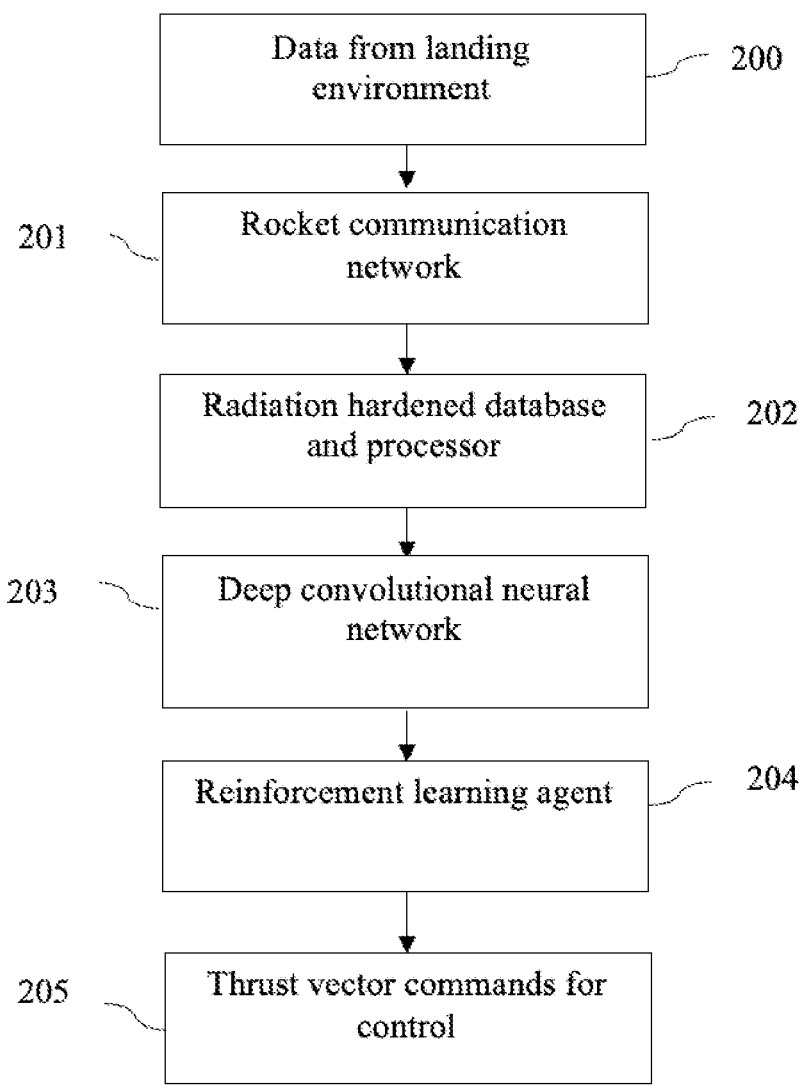
FIG. 2 describes embodiments of the present invention as an information flow model.

FIG. 2 describes embodiments of the present invention as an information flow model including data from the landing environment (200); travelling across the rocket's communication network (201); to a radiation hardened database and processor (202); where the data is processed by a deep convolutional neural network for computer vision (203); and a reinforcement learning agent which takes actions (204); to command thrust vector controls for the rocket (205).

In certain embodiments of the invention, the disclosed methods include sensors mounted on the rocket in various positions collecting data about the rocket's environment. The sensor types may include GPS, radar, LiDAR, or inertial navigation systems. The data are stored in the rocket's database and subsequently processed by neural networks to create a digital environment. The digital environment is manipulated by a reinforcement learning agent, which produces and performs optimal commands to manipulate rocket control. The rocket's control is then guided along an optimal landing trajectory, which is complete upon a safe landing at a landing zone. Using the present invention, the rocket lands safely regardless of changes in the environment because the neural networks are able to generalize and account for randomness, informing the reinforcement learning programs actions, which are guided by an optimal control policy. The optimal control policy and neural network are embedded in the rocket's hardware and linked to sensors and thrust vector controls using a secure wireless communication network.

In certain embodiments of the invention, the disclosed methods include LiDAR sensors gathering real-time data about the environment. The data are stored in an on-board database and processed with a deep reinforcement learning algorithm producing instructions to optimize rocket control in uncertain environments including inclement weather conditions. A second trained deep reinforcement learning agent then performs the instructions, commanding the rocket's control systems. The rocket's control systems, which typically include the attitude control system, reaction control system and other control systems are unified into a single control system, directly controlling trajectory by manipulating thrust.

In certain embodiments of the invention, the disclosed methods include data sensors gathering real-time data about the environment, which is stored in an on-board database. The data is projected to a point-cloud environment, which is an object modeling the landing zone in real time. The data is further processed with a deep reinforcement learning algorithm controlling the rocket through command sequences corresponding to thruster command controls to manipulate rocket positioning including roll, pitch, yaw, and attitude. As such, the present invention unifies two elements, perception and decision making. The invention solves perception using neural networks, processing data and predicting environmental changes. The invention solves machine decision theory using a trained reinforcement learning agent to decide which action to take according to objective value metrics, which command the rocket's control system.

In certain embodiments of the invention, the sensor types include GPS, radar, LiDAR, and inertial navigation systems. The data is projected to a point-cloud environment modeling the physical world in real time and the data is further processed with a reinforcement learning algorithm. The reinforcement learning algorithm controls the rocket through command sequences corresponding to thrust vector values. The intelligent thrust controls manipulate rocket positioning including roll, pitch, yaw, and attitude through a singular rocket control system. The control system transfers information end-to-end using a wireless communications network across the rocket's hardware.

In certain embodiments, the invention is comprised of three parts. First, sensors collect data about the rocket's environment, passing the information to a database onboard a rocket booster, which previously separated from an upper rocket stage in orbit. The data is transmitted and aggregated in an organized format, which is optimized for security and efficiency. Second, the rocket's processor manipulates the database with a deep reinforcement learning computer program embedded in the rocket's processor. The reinforcement learning algorithm includes an agent which has been trained in a simulation environment, interacting with the rocket's data collected by sensors which represent the rocket's physical landing zone. Third, the instructions command the rocket booster's control system for optimal performance, evolving according feedback from the rocket booster's physical environment, accounting for stochastic uncertainties.

In certain embodiments, the invention is methods for landing rockets using a deep reinforcement learning computer program embedded in an FGPA. The FGPA is radiation hardened supporting safety and protecting against damage from radiation in space. The FGPA has both memory and processing capabilities, supporting dynamic programming and iterative improvement. The FGPA communicates with both the rocket's data sensors and control system. The hardware receives data, processing the data with a deep learning algorithm which informs a reinforcement learning algorithm that controls the rocket's thrust output. As such, the methodology provides a way to autonomously land rockets end-to-end. Moreover, the controls produce instructions for optimizing mission performance, a safe and accurate landing at the landing zone.

In certain embodiments of the invention, a rocket launches a satellite to orbit and returns to Earth. During return, an autonomous control system activates with the push of a button. Once activated, the control system autonomously commands the rocket by processing real time data about the landing zone and adapting the rocket's mechanics, positioning, and trajectory accordingly by manipulating the rocket's thrust vector output. The method uses multiple LiDAR sensors, GPS sensors, and inertial navigation sensors on the rocket, landing pad, or other locations like drones or ships, to create a 3D point-cloud environment. In real time, a convolutional neural network identifies the landing zone performing the rocket's vision function. Meanwhile, an embedded reinforcement learning agent maximizes a reward function defining optimal landing metrics including distance, time, and impact trajectory and force.

It is to be understood that while certain embodiments and examples of the invention are illustrated herein, the invention is not limited to the specific embodiments or forms described and set forth herein. It will be apparent to those skilled in the art that various changes and substitutions may be made without departing from the scope or spirit of the invention and the invention is not considered to be limited to what is shown and described in the specification and the embodiments and examples that are set forth therein. Moreover, several details describing structures and processes that are well-known to those skilled in the art and often associated with rockets and landing rocket boosters or other launch vehicles are not set forth in the following description to better focus on the various embodiments and novel features of the disclosure of the present invention. One skilled in the art would readily appreciate that such structures and processes are at least inherently in the invention and in the specific embodiments and examples set forth herein.

One skilled in the art will readily appreciate that the present invention is well adapted to carry out the objectives and obtain the ends and advantages mentioned herein as well as those that are inherent in the invention and in the specific embodiments and examples set forth herein. The embodiments, examples, methods, and compositions described or set forth herein are representative of certain preferred embodiments and are intended to be exemplary and not limitations on the scope of the invention. Those skilled in the art will understand that changes to the embodiments, examples, methods and uses set forth herein may be made that will still be encompassed within the scope and spirit of the invention. Indeed, various embodiments and modifications of the described compositions and methods herein which are obvious to those skilled in the art, are intended to be within the scope of the invention disclosed herein. Moreover, although the embodiments of the present invention are described in reference to use in connection with rockets or launch vehicles, ones of ordinary skill in the art will understand that the principles of the present inventions could be applied to other types of aerial vehicles or apparatus in a wide variety of environments, including environments in the atmosphere, in space, on the ground, and underwater.

The invention claimed is:

1. A method for autonomously landing rockets,
the method comprising a rocket returning from orbit,
data sensors collecting data regarding the rocket's landing environment,
a network conveying the data from data sensors to a database and
a processor which is a radiation hardened, field programmable gate array, further comprising a graphics processing unit,
computing visual data from the network, and processing the visual data with a deep reinforcement learning algorithm controlling the rocket during landing,
the database and processor further processing the data with a deep neural network, predicting changes in environmental variables and informing a reinforcement learning algorithm, processing the data, and taking actions to control thruster output, optimizing landing metrics, and completing a safe landing.

2. The method of claim 1 wherein, the deep neural network predicts changes in environmental variables, associatively assigning value to actions, further relaying the values to a reinforcement learning program, iteratively taking actions according to the value data.

3. The method of claim 1 wherein, the reinforcement learning algorithm controls a valve, releasing the rocket's thrust chamber, ejecting explosive propellant from the rocket's nozzle.

4. The method of claim 1 wherein, the data sensors collect data, including GPS data, LiDAR data, inertial data, and radio wave data, sending the data to a database and processor, processing the data with a deep reinforcement learning algorithm, producing instructions commanding the rocket's reaction control system.

5. The method of claim 1 wherein, the deep neural network, convolutes visual data from data sensors, producing visual information, informing intelligent decisions, controlling the rocket's attitude control system.

6. The method of claim 1 wherein, the reinforcement learning algorithm further comprises a value function, assigning value to state information, defining the landing environment, informing intelligent decisions for control during landing.

7. A method for autonomously landing rockets,
the method comprising a rocket,
LiDAR sensors and GPS sensors collecting data,
a wireless communications network transmitting data to a database and computer processor, wherein,
the database and processor are configured using a radiation hardened, field programmable gate array,
computing data using an embedded artificial intelligence computer program,
commanding the rocket's control system,
the database and processor further processing the data with a deep reinforcement learning algorithm, manipulating the data to produce commands, controlling the rocket's reaction control system, optimizing landing performance at a defined landing zone.

8. The method of claim 7 wherein, the deep reinforcement learning program processes information, taking actions optimizing metrics, corresponding to controls for minimizing landing variables, including distance, time, and impact force.

9. The method of claim 7 wherein, the commands controlling the rocket's reaction control system to optimize landing metrics, generate as the result of calculations using landing zone data, aggregating in real time from data sensors, generating a virtual environment for statistical processing using a deep neural network.

10. The method of claim 7 wherein, the deep reinforcement learning algorithm, processes visual data, applying computer vision algorithms further comprising at least one convolutional neural network, ascribing value to states describing the dynamics for the landing zone.

11. The method of claim 7 wherein, the deep reinforcement learning algorithm further comprises, a trained policy optimization algorithm and an agent, generalizing and acting according to predictions from an expert system computer program using embedded intelligence to control the rocket for a safe landing in a defined landing zone.

12. The method of claim 7 wherein, deep reinforcement learning algorithm further comprises, a trained policy optimization algorithm and an agent, generalizing and acting according to predictions from a deep neural network computer program.

13. A method for landing rockets, the method comprising,
a rocket, returning from orbit with,
data sensors, collecting data about the landing environment and transmitting the data using a communications network to a database and processor,
receiving information and generating a virtual environment,
wherein,
the virtual environment digitally configures with matrix representations, generating a four-dimensional object for the landing zone, further processing by a reinforcement learning agent computing and executing optimal control commands, regulating the rocket's thrust output, the virtual environment further using a neural network, predicting action value for a reinforcement learning agent, taking action manipulating data to instruct the rocket's control system optimizing precision control, and autonomously landing the rocket.

14. The method of claim 13 wherein, the database and processor are configured using a field programmable gate array, protecting against radiation damage using radiation resistant rendering during the manufacturing process.

15. The method of claim 13 wherein, the neural network further comprises one input layer, processing the data, at least one convolutional layer, convoluting the data, and at least one output layer, labeling the data.

16. The method of claim 13 wherein, the neural network further comprises one input layer, more than one hidden layer, processing the data, and at least one output layer, labeling the data.

17. The method of claim 13 wherein, autonomously landing the rocket further comprising a computer program, providing for a manual override, enabling manual control software for controlling the rocket's thrust vectors during landing.

* * * * *